Oct. 21, 1947.                S. W. GILBERT                2,429,313
                             CONTROL APPARATUS
                           Filed Nov. 23, 1943

INVENTOR
STANLEY W. GILBERT
BY- *Lester W Clark*
                AGENT

Patented Oct. 21, 1947

2,429,313

UNITED STATES PATENT OFFICE 2,429,313

CONTROL APPARATUS

Stanley W. Gilbert, Middletown, Conn., assignor, by mesne assignments, to Niles-Bement-Pond Company, West Hartford, Conn., a corporation of New Jersey Application November 23, 1943, Serial No. 511,425

6 Claims. (Cl. 267—1)

The present invention relates to control apparatus, and particularly to apparatus for biasing a control device to a predetermined position, so that upon failure of the normal actuating mechanism for the control device, it is moved to that position.

The present invention was developed in connection with apparatus for controlling the throttle on an aircraft carburetor. These throttles are sometimes located at a considerable distance from the manual lever by which they are operated. Occasionally, the mechanical or other linkage between the manual lever and the throttle fails. Under such conditions, it has been found desirable to have the throttle moved to an intermediate position. Spring operated means for biasing a device to a position intermediate the ends of its range of travel are generally old. In such devices of the prior art, the loading of the spring varies considerably as the device departs from the position to which it is biased. It is therefore necessary to exert a much greater force to move the device when it is near the ends of its range of travel than is required when the device is near the intermediate position to which it is biased. Also, in the previous devices, the spring loading decreases to zero at that position, so that, for a small range of positions, the spring is not sufficient to move the device. Therefore, the device is not positively moved to a definite position, but is subject to considerable variation in the position finally assumed.

It is therefore an object of the present invention to provide improved means for biasing a driven device to a position intermediate the ends of its range of travel.

Another object is to provide improved biasing means of the type described, in which the force necessary to overcome the biasing means is substantially constant for all positions of the biased device.

Figure 1:
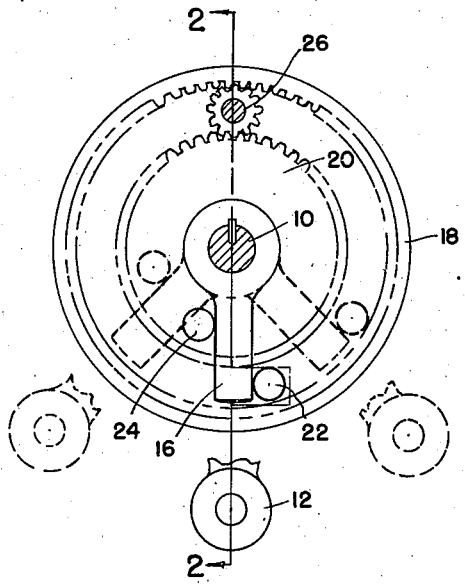
Figure 2:
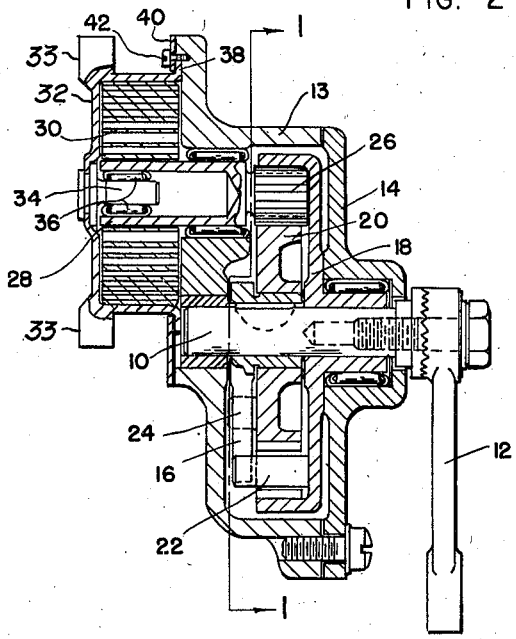

Other objects and advantages of the present invention will become apparent from the appended specification, claims, and drawing, in which Figure 1 is a view of a device embodying the principles of my invention, taken on the line 1—1 of Figure 2, looking in the direction of the arrows, and omitting certain of the parts for the sake of clarity, and Figure 2 is a cross-sectional view of the complete device, taken on the line 2—2 of Figure 1, and looking in the direction of the arrows.

Referring to the drawing, there is shown a shaft 10, which may be attached for movement with the throttle of a carburetor, or other device to be positioned, by means of an arm 12. The shaft 10 passes thru the cover 14 of a casing 13, which contains the mechanism embodying my invention.

Inside the casing 13, an arm 16 is keyed on the shaft 10 for rotation therewith. A ring gear 18, with internal teeth, is rotatably mounted on the shaft 10. Another gear 20, having external teeth, is also rotatably mounted on the shaft 10. The gear 20 is of substantially smaller diameter than the ring gear 18. The ring gear 18 carries a pin 22, which projects thru the space between the gears 18 and 20, into the path of movement of the arm 16. The gear 20 carries another pin 24, which also projects into the path of movement of arm 16, but which lies on the opposite side of arm 16 from the pin 22.

A pinion gear 26 is carried by a shaft 28 journaled in the casing 13. The pinion gear 26 lies between and mates with both of gears 18 and 20. A spiral spring 30 is attached at its outer end to a cup-shaped casing 32 and its inner end to the shaft 28.

The cup-shaped casing 32 carries at its center a stub shaft 34 which projects into a recess in the shaft 28, and is journaled therein by needle bearings 36. The casing 32 is provided with a flange 38 which is retained in place on the casing 13 by a ring 40. The ring 40 may be attached to casing 13 by any suitable means (not shown). One or more notches are provided in the edge of flange 38 to receive a screw or screws 42, which hold the housing 32 against rotation. By loosening the screw 42 and rotating the casing 32, the tension of the spring 30 may be varied. If necessary, means, such as the wings 33, may be provided to facilitate rotation of the casing 32 to adjust the spring loading.

The spring 30 biases the shaft 28 and pinion 26 for clockwise movement, as viewed in Figure 1. Therefore, it may be seen that the spring 30 acts through the pinion 26 to bias gear 20 for movement in a counter-clockwise direction so as to carry pin 24 into engagement with arm 16. Likewise, the spring 30, acting through pinion 26, biases the ring gear 18 for movement in a clockwise direction to carry pin 22 into engagement with the opposite side of arm 16.

Operation

When the parts are in the positions shown in Figure 2, and illustrated in full lines in Figure 1, the shaft 10 is in the position to which it is biased by the spring 30. Both the pins 24 and 22 are engaging the arm 16, and the spring 30 therefore tends to maintain the shaft 10 in the angular position illustrated.

If the shaft 10 is rotated counterclockwise by the application of a force to arm 12, the arm 16 engages pin 22 and causes a counterclockwise motion of ring gear 18. This turns pinion gear 26 counterclockwise, thereby winding the spring 30. At the same time, the rotation of pinion gear 26 causes gear 20 to rotate clockwise, thereby causing pin 24 to move away from the position shown in the drawing.

If the arm 12 is operated to turn the shaft 10 clockwise, arm 16 engages pin 24, causing a clockwise movement of gear 20 and operating pinion 26 in a counterclockwise direction to wind up the spring 30. At the same time, the ring gear 18 is moved counterclockwise, because of its engagement with the pinion gear 26.

If the arm 16 is moved from the full line position illustrated in Figure 1 to either of the dotted line positions shown in that figure, then the pins 22 and 24 take up the positions illustrated in dotted lines in Figure 1. One or the other of the pins 22 and 24 always engages the arm 16. If the driving mechanism fails when the arm 16 is in any angular position except its full line position in Figure 1, the spring 30 then acts thru one of the pins to move the arm 16 to the full line position.

Since the spring 30 may be made quite long with respect to the amount of rotation required of shaft 28, the variation in its spring rate over the required range of movement of shaft 10 may be made so small as to be inconsequential. In that manner, the same force is required to move the arm 12 near either end of its range of travel as is required to move it near the center of its range of travel.

Furthermore, it may be seen that the spring 30 acts on the arm 16 and positively moves it with substantially the same force until it reaches the position where it is engaged by both pins 22 and 24. There is thus no variation in the position finally assumed by the arm 16 under the influence of spring 30.

While I have shown and described a preferred embodiment of my invention, other modifications thereof will readily occur to those skilled in the art, and I therefore intend my invention to be limited only by the appended claims.

I claim as my invention:

1. Control apparatus, comprising the combination with a shaft to be rotated thru an arc, and means for rotating said shaft, of means for biasing said shaft to a predetermined angular position comprising an arm on said shaft, an internal gear concentric with said shaft, an external gear concentric with said shaft and of smaller diameter than said internal gear, a pair of pins each attached to one of said gears and disposed on opposite sides of said arm, a pinion journaled on a fixed support and mating with both said gears, and spiral spring means biasing said pinion for rotation in a direction to cause movement of both said pins into engagement with said arm.

2. Control apparatus, comprising the combination with a shaft to be rotated thru an arc, and means for rotating said shaft, of means for biasing said shaft to a predetermined angular position comprising an arm on said shaft, an internal gear concentric with said shaft, an external gear concentric with said shaft and of smaller diameter than said internal gear, a pair of pins each attached to one of said gears and disposed on opposite sides of said arm, a pinion journaled on a fixed support and mating with both said gears, and yieldable means biasing said pinion for rotation in a direction to cause movement of both said pins into engagement with said arm.

3. Control apparatus, comprising the combination with a shaft to be rotated thru an arc, and means for rotating said shaft, of means for biasing said shaft to a predetermined angular position comprising an arm on said shaft, an internal gear concentric with said shaft, an external gear concentric with said shaft and of smaller diameter than said internal gear, a pair of pins each attached to one of said gears and disposed on opposite sides of said arm, a pinion journaled on a fixed support and mating with both said gears, spiral spring means biasing said pinion for rotation in a direction to cause movement of both said pins into engagement with said arm, and means for adjusting the loading of said spring means.

4. Control apparatus including a rotatable shaft, means for rotating said shaft, and means for biasing said shaft to a predetermined central position, said last-named means comprising an arm extending radially from said shaft, a pair of members movable along circular paths concentric with said shaft and disposed upon opposite sides of said arm for abutment therewith, motion-transmitting means directly connecting said members for simultaneous movement along their respective paths in opposite directions so that clockwise movement of one member is accompanied by counterclockwise movement of the other member, and means connected to said motion-transmitting means to bias said members for movement toward said arm.

5. Control apparatus including a rotatable shaft, means for rotating said shaft, and means for biasing said shaft to a predetermined central position, said last-named means comprising an arm extending radially from said shaft, a pair of members movable along circular paths concentric with said shaft and disposed upon opposite sides of said arm for abutment therewith, a gear train connecting said members for simultaneous movement along their respective paths in opposite directions so that clockwise movement of one member is accompanied by counterclockwise movement of the other member, and yieldable means connected to said gear train to bias said members for movement toward said arm.

6. Control apparatus including a rotatable shaft, means for rotating said shaft, and means for biasing said shaft to a predetermined central position, said last-named means comprising an arm extending radially from said shaft, a pair of members movable along circular paths concentric with said shaft and disposed upon opposite sides of said arm for abutment therewith, motion-transmitting means connecting said members for simultaneous movement along their respective paths in opposite directions so that clockwise movement of one member is accompanied by counterclockwise movement of the other member, spring means connected to said motion-transmitting means to bias said members for movement toward said arm, and means for adjusting the initial loading of said spring means.

STANLEY W. GILBERT.

REFERENCES CITED

The following references are of record in the file of this patent:

UNITED STATES PATENTS

| Number | Name | Date |
|---|---|---|
| 2,143,271 | Jay | Jan. 10, 1939 |
| 1,355,585 | Zwarich | Oct. 12, 1920 |
| 1,667,152 | Hegge | Apr. 24, 1928 |
| 2,186,653 | Penote | Jan. 9, 1940 |

FOREIGN PATENTS

| Number | Country | Date |
|---|---|---|
| 396,343 | Great Britain | Aug. 3, 1933 |